United States Patent [19]

Odagiri

[11] 3,764,758

[45] Oct. 9, 1973

[54] MAGNETIC RECORDING AND/OR REPRODUCING APPARATUS WITH TRANSDUCER EXTENDING THROUGH A RECORD SUPPORT PLATE HAVING AN ANNULAR GROOVE COEXTENSIVE WITH RECORD TRACK

[75] Inventor: Yoichi Odagiri, Tsurumi-ku, Yokohama-shi, Kanagawa-ken, Japan

[73] Assignee: Sony Corporation, Tokyo, Japan

[22] Filed: May 23, 1972

[21] Appl. No.: 256,151

[30] Foreign Application Priority Data

May 26, 1971 Japan ................................ 46/43209
June 15, 1971 Japan ................................ 46/50957

[52] U.S. Cl. ..................... 179/100.2 P, 340/174.1 E
[51] Int. Cl. ............................................. G11b 5/60
[58] Field of Search ............... 179/100.2 P, 100.2 R, 179/100.2 CA; 340/174.1 E, 174.1 F

[56] References Cited

UNITED STATES PATENTS

| | | | |
|---|---|---|---|
| 3,696,350 | 10/1972 | Cohen | 340/174.1 E |
| 2,950,353 | 8/1960 | Fomenko | 179/100.2 P |
| 3,688,285 | 8/1972 | Lawrence et al. | 340/174.1 E |
| 3,678,219 | 7/1972 | Dennis | 179/100.2 P |
| 3,179,945 | 4/1965 | Shapiro | 340/174.1 E |
| 3,537,083 | 10/1970 | Voth | 340/174.1 E |
| 3,178,719 | 4/1965 | Shapiro | 340/174.1 E |
| 3,405,405 | 10/1968 | Boissevain et al. | 340/174.1 E |

*Primary Examiner*—Terrell W. Fears
*Assistant Examiner*—Alfred H. Eddleman
*Attorney*—Lewis H. Eslinger et al.

[57] ABSTRACT

An apparatus for magnetically recording and repeatedly reproducing electrical signals, for example, for use in the slow-motion or still playback of video signals, includes a pliant record disk mounted, at its center, on a rotatable shaft and having a magnetizable surface that is engaged by an electromagnetic transducer or head extending through a support plate for recording or reproducing signals in at least one annular area or record track. When the shaft is at rest, the pliant disk can lie limply against, and be supported by the support plate. In order to avoid the pickup of dust at each annular record track area of the record disk, the surface of the support plate confronting the record disk is formed with an annular groove or recess which is at least coextensive with each record track area on the record disk so that the latter cannot contact the support plate and pick up dust therefrom in each record track area. Further, when the apparatus is enclosed in a cabinet, air deflectors depend therefrom to near the record disk to create turbulence in any centrifugally induced airflow that might otherwise cause the record disk to deflect away from the support plate, particularly near the periphery of the record disk.

6 Claims, 9 Drawing Figures

PATENTED OCT 9 1973 3,764,758

MAGNETIC RECORDING AND/OR REPRODUCING APPARATUS WITH TRANSDUCER EXTENDING THROUGH A RECORD SUPPORT PLATE HAVING AN ANNULAR GROOVE COEXTENSIVE WITH RECORD TRACK

This invention relates generally to magnetic recording and/or reproducing apparatus, and more particularly is directed to improvements in apparatus of the type in which signals, such as, video signals, are magnetically recorded in an annular record track on a pliant record disk and thereafter repeatedly reproduced, for example, as in the slow motion or still playback of video signals.

In previously proposed apparatus of the above described type, for example, as specifically disclosed in U.S. Pat. No. 2,950,353, the pliant record disk is mounted, at its center, on a rotatable shaft and has a magnetizable surface on which signals are recorded and/or reproduced in an annular area or record track by means of an electromagnetic transducer or head extending through a support plate which confronts the magnetizable surface of the record disk. When the shaft is at rest, the pliant record disk can lie limply against, and be supported by the support plate. On the other hand, when the shaft is rotated, the pliant record disk is centrifugally urged to a planar configuration so as to be spaced from the support plate. In the previously proposed apparatus, the electromagnetic transducer or head is arranged relative to the support plate so as to be also spaced from the magnetizable surface of the pliant record disk when the latter is rotated with the shaft and thereby urged centrifugally to its planar configuration. Thus, it is intended that there should be a gap or absence of contact between the transducer or head and the record disk during the recording and reproducing operations of the apparatus for avoiding wearing of the magnetizable surface of the record disk. In such "non-contact" magnetic recording and/or reproducing apparatus, it is desirable that the gap between the rotated pliant record disk and the associated magnetic transducer or head be maintained as small as possible since the amplitude of the recorded and reproduced signals is directly related to the spacing between the magnetizable surface of the record disk and the transducer or head. However, many difficulties are experienced in maintaining constant the width of a narrow gap between the pliant record disk and the transducer during the rotation of the disk. Therefore, it has been the practice with an apparatus of the described character to employ a gap width between the rotated pliant record disk and associated transducer or head that necessitates the use of a relatively high gain amplifier to compensate for the consequently reduced amplitude of the recorded and reproduced signals. Further, the "non-contact" apparatus is not suitable for use in connection with the recording and repetitive reproducing of video signals, for example, in connection with the slow-motion or still playback of video or television signals, in which case a wide band frequency response is required, for example, a band width of at least 4.5 MHz.

In recognition of the foregoing disadvantages of an apparatus of the described type in which the transducer or head is spaced from the pliant record disk during recording and reproducing operations, it has been proposed, for example, in U.S. Pat. No. 3,373,413, to employ, as the record disk, a thin sheet or membrane of Mylar (a polyethylene terephthalate polymer) having a magnetizable coating, for example, of iron oxide, on one of its surfaces, and being radially stretched equally in all directions and held in its stretched condition by means of metal rings cemented to the periphery of the pliant disk or membrane. With the foregoing record disk, there is no need to provide a support surface to support the record disk when the latter is at rest, as the peripheral rings make the stretched disk substantially self supporting. Further, the magnetizable surface of the record disk is intimately contacted by the magnetic transducer or head during recording and reproducing operations. Although such arrangement avoids the previously mentioned difficulties experienced when a gap is maintained between the pliant record disk and the transducer or head, the uniform stretching of the pliant magnetizable membrane or sheet material, and its secure attachment to the peripheral supporting rings while maintaining the uniform stretching present serious manufacturing problems.

If, on the other hand, the above described problems associated with the arrangement disclosed in U.S. Pat. No. 2,950,353, are sought to be overcome merely by locating the magnetic transducer or head for contact with the pliant record disk during the recoring or reproducing operation, that is, when the pliant disk is centrifugally urged to a planar configuration, undesirable wear and a resulting short useful life of the record disk is experienced. It has been found that such undesirable wear results mainly from the fact that the magnetizable surface of the pliant record disk contacts the support plate through which the transducer or head extends, and thus picks up dust from the support plate, at intervals between recording and reproducing operations, that is, when the pliant record disk is at rest and engages limply against the support plate. Thereafter, during a recording or reproducing operation, the dust adhering to the magnetizable surface of the record disk, particularly, at the annular record track area thereof repeatedly traced by the transducer or head, causes undesirably high friction and wearing away or other marring of the magnetizable surface of the pliant record disk if actually contacted by the transducer or head. Such marring or wearing away of the magnetizable surface will cause so-called "drop-out" of video signals during the recording or reproducing thereof.

Accordingly, it is an object of this invention to provide a magnetic recording and/or reproducing apparatus of the type in which signals are magnetically recorded in an annular record track on the magnetizable surface of a pliant record disk by means of an associated magnetic transducer or head, and in which the previously mentioned disadvantages of the existing apparatus of that type are avoided.

More specifically, it is an object of this invention to provide an apparatus of the described type in which the magnetic transducer or head is in actual contact with the magnetizable surface of the pliant record disk during a recording or reproducing operation so as to make the apparatus suitable for use in connection with video signals, for example, in connection with the slow-motion or still playback of video signals, and undesirable wear is avoided notwithstanding the contact of the transducer or head with the magnetizable surface.

Still another object is to provide a magnetic recording and/or reproducing apparatus as aforesaid, which is contained within a cabinet, and in which air deflecting elements are provided within the cabinet, particularly adjacent the rotated pliant record disk for disrupting or rendering randomly turbulent any air flows that are centrifugally induced across the record disk, whereby to avoid the deflection of the record disk relative to the magnetic transducer or head as a result of pressure differentials.

In accordance with an aspect of this invention, an apparatus for magnetically recording and/or reproducing signals on a pliant record disk mounted, at its center, on a rotatable shaft has the magnetizable surface of the record disk engaged or contacted by a magnetic transducer or head extending through a support plate for recording or reproducing the desired signals in at least one annular area or record track, and the surface of the support plate confronting the record disk is formed with an annular groove or recess which is at least coextensive with each record track area on the record disk so that contact of the latter with the support plate at each record track area is avoided to prevent the pickup of dust from the support plate onto the record track area of the record disk.

The above, and other objects, features and advantages of the invention, will be apparent in the following detailed description of illustrative embodiments thereof which is to be read in connection with the accompanying drawings, wherein.

Figure 1:
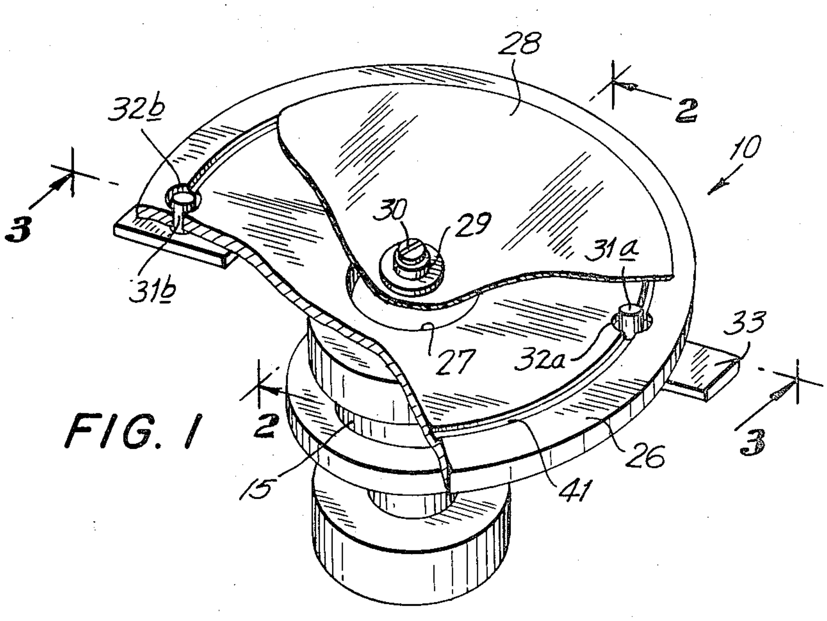
FIG. 1 is a perspective view, partly broken away and in section, of a portion of a magnetic recording and/or reproducing apparatus according to one embodiment of this invention.
Figure 2:
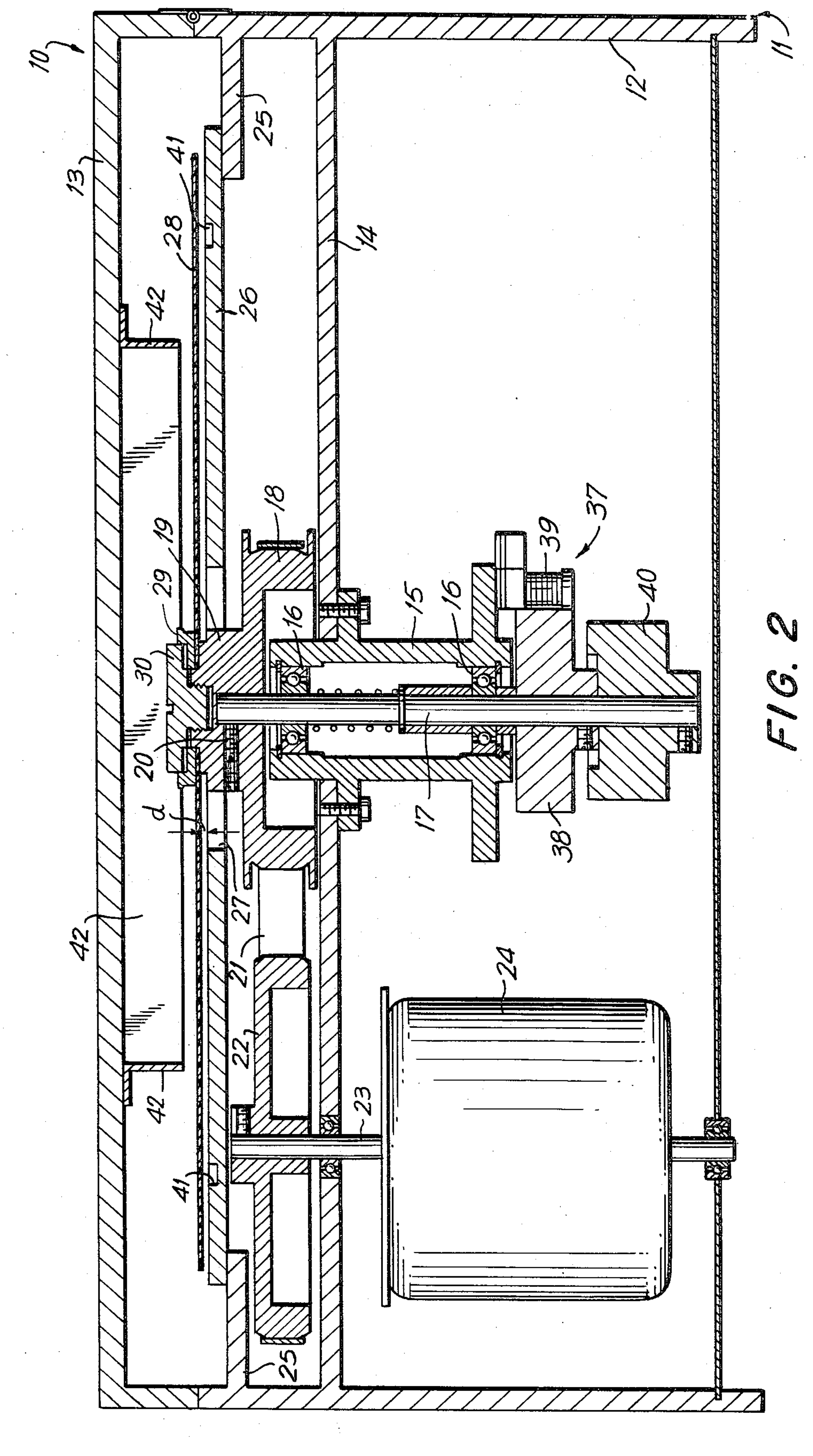
FIG. 2 is an enlarged vertical sectional view taken along the line 2—2 on FIG. 1.
Figure 3:
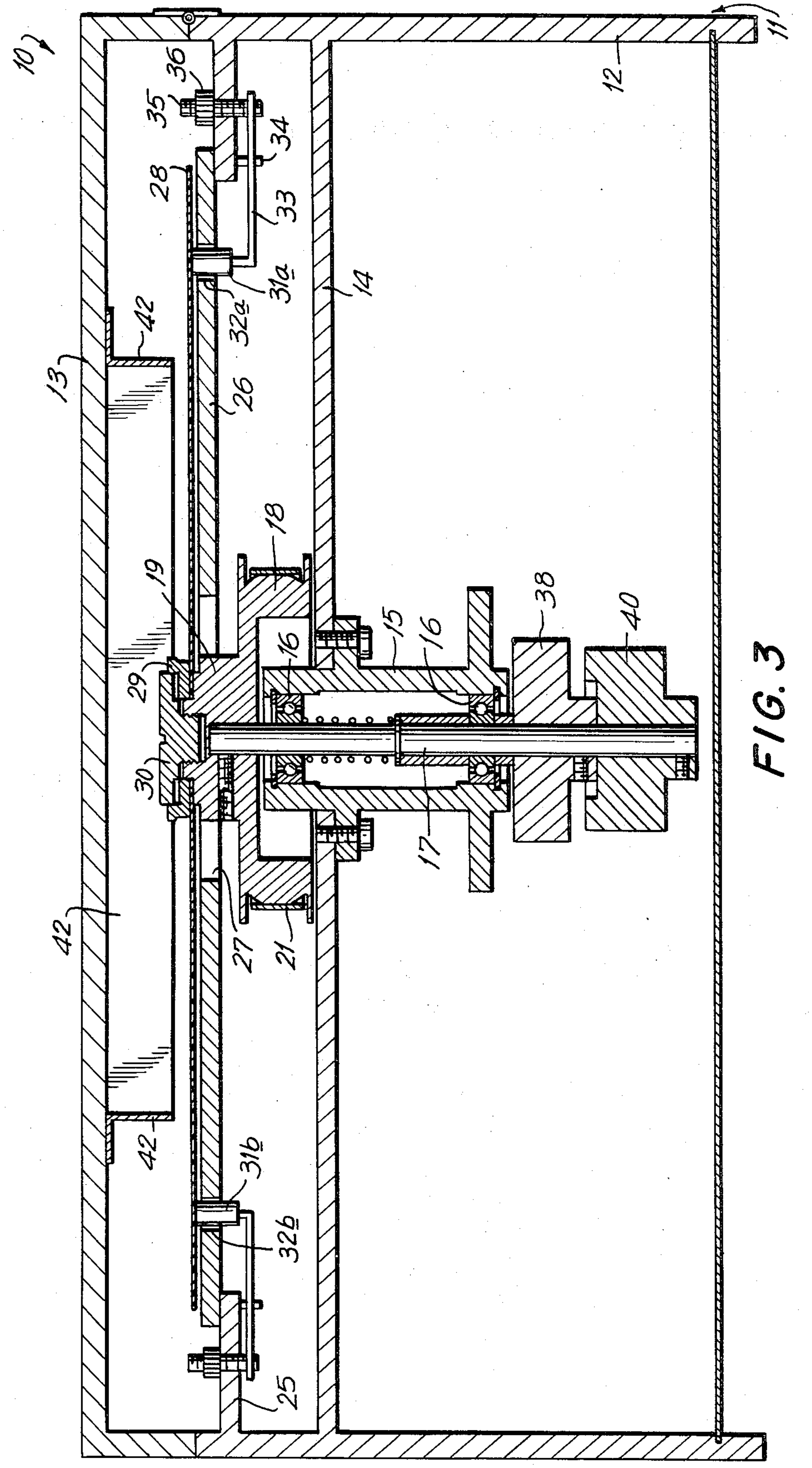
FIG. 3 is an enlarged, vertical sectional view taken along the line 3—3 on FIG. 1.

Referring to the drawings in detail, and initially to FIGS. 1–3 thereof, it will be seen that a magnetic recording and/or reproducing apparatus 10 in accordance with this invention may generally comprise a cabinet 11 having a base 12 with a hinged cover or lid 13 (FIGS. 2 and 3) for normally closing the top of cabinet base 12. As shown, cabinet base 12 has a partition 14 extending thereacross below the top of the base and centrally supporting a depending bearing holder 15 in which bearings 16 are retained for rotatably supporting a vertical shaft 17. A pulley 18 having a hub 19 is secured on the upper end of shaft 17, as by a set screw 20, and is engaged by a belt 21 which is, in turn, driven by a pulley 22 secured on the shaft 23 of a suitable electric motor 24 mounted within body 12 below partition 14.

A ledge 25 projects inwardly from the side wall of cabinet body 12 adjacent the top of the latter and carries a metal support plate 26 at the periphery of the latter. Support plate 26 is provided with a central opening 27 into which hub 19 projects upwardly with substantial radial clearance therebetween.

A pliant record disk 28 is centrally secured on a locating surface on hub 19 above support plate 26, for example, by means of a clamping ring 29 which holds the central portion of disk 28 on hub 19 and is secured to the latter by a locking screw 30. The pliant record disk 28 may be formed of a suitable plastic, for example, of the polyethylene terephthalate polymer available commercially under the tradename Mylar, and its lower surface, that is, its surface facing toward support plate 26 is magnetizable, for example, formed by a coating of iorn oxide. It is desirable that the thickness of the pliant record disk 28 be in the range between approximately 0.02 inch and 0.06 inch, and that the diameter of record disk 28 be greater than six inches in the case where it is desired to record video signals having a band width of from 3.8 to approximately 5.4 MHz. In a particularly desirable embodiment of this invention, the record disk 28 has a thickness of 0.026 inches and a diameter of 11 inches. The locating surface of hub 19 against which the central portion of record disk 28 is clamped is spaced upwardly from the top surface of support plate 26 by a small distance $d$ which is preferably in the range from about 0.004 to 0.04 inches. Thus, when motor 24 is operated to rotate pulley 18 and its hub 19 on shaft 17, and hence to rotate pliant record disk 28, the latter is centrifugally urged to a planar configuration, as shown on FIGS. 2 and 3, with the magnetizable lower surface of the planar record disk 28 being spaced by the small distance d from the upper surface of support plate 26. However, when the pliant disk 28 is at rest, it sags under the influence of gravity and can lie limply against and be supported by the underlying support plate 26.

In order to record and reproduce signals on the magnetizable undersurface of record disk 28, the apparatus 10 is further shown to include electro-magnetic transducers or heads 31*a* and 31*b* (FIGS. 1 and 3) which project upwardly through respective holes 32*a* and 32*b* provided in support plate 26 at diametrically opposed locations. Each of the heads 31*a* and 31*b* is shown to be supported from below by a mounting bracket 33 which is vertically slidable on a guide 34 depending from the adjacent ledge 25, and which is secured to a screw 35 extending upwardly through a bore in the ledge 25 and receiving a knurled nut 36 by which the vertical position of bracket 33, and hence of the respective head 31*a* or 31*b*, can be adjusted relative to ledge 25. In the apparatus 10 according to this invention, each of the heads 31*a* and 31*b* is adjusted to project upwardly above the upper surface of support plate 26 by at least the previously mentioned distance $d$ so as to contact the magnetizable lower surface of record disk 28 even when the latter is centrifugally urged to its planar configuration during recording or reproducing operations of the apparatus 10. The heads 31*a* and 31*b* may be disposed at the same radial distance from the axis of shaft 17, as shown, or at different radial distances from that axis, so as to record and reproduce signals in the same or in different annular record tracks, respectively, on the magnetizable surface of disk 28.

If the heads 31*a* and 31*b* are at the same radial distance from the axis of shaft 17 so as to record and reproduce signals in the smae annular record track, the signals, for example, video signals, to be recorded may be supplied alternately to the heads 31*a* and 31*b* in synchronism with the rotation of record disk 28, so as to record one field or one frame in each half of the annular record track. In order to provide a reference or index signal for indicating the position of record disk 28 relative to heads 31*a* and 31*b*, apparatus 10 may include a pulse generator 37 having a magnet member 38 secured on the lower end portion of shaft 17 and presenting alternately opposed magnetic poles about its periphery for producing or generating pulses in a head 39 which depends from bearing support or holder 15 adjacent the periphery of magnet member 38. Further, a suitable eddy current brake 40 may be secured on the lower end of shaft 17 for arresting the rotation of the shaft 17 and hence of record disk 28 at the conclusion of a recording or reproducing operation.

Since heads 31*a* and 31*b* are in contact with the magnetizable undersurface of record disk 28 while the latter is rotated during a recording or reproducing operation, it is important that the annular area of the record track on disk 28 thus engaged by heads 31*a* and 31*b* be substantially free of any dust that might be picked up from support plate 26 at a time when record disk 28 is at rest and sags limply against the upper surface of support plate 26. In accordance with the present invention, the transfer or pickup of dust from support plate 26 to the annular area of each record track on record disk 28 is avoided by forming the surface of support plate 26 which confronts disk 28, with an annular groove or recess 41 which is at least coextensive with the annular area of each record track traced on disk 28 by heads 31*a* and 31*b*. In the case where heads 31*a* and 31*b* trace a single annular record track on the undersurface of record disk 28, then the upper surface of support plate 26 will have a single annular recess or groove 41 concentric with the axis of rotation of record disk 28 and radially dimensioned so that each of the heads 31*a* and 31*b* lies between the inner and outer margins of groove 41. The depth of the annular groove or recess 41 may vary to a fairly large extent and is preferably at least from about 0.02 inches to 0.032 inches, and the radial width of the groove 41 is at least equal to the dimension of each head 31*a* or 31*b* in the corresponding direction. In a particular embodiment of this invention, the diameter of groove 41, measured to its center line, is 9 inches, and the groove 41 has a radial width of 0.06 inches, while the heads 31*a* and 31*b* are spaced from each other by a distance of 9 inches, measured to their center points, and each head has a dimension in the radial direction of record disk 28 of about 0.05 inches.

It will be apparent that, with the above described arrangement according to this invention, when record disk 28 is at rest and therefore sags limply against support plate 26, the annular area of the undersurface or record disk 28 which constitutes the record track traced by heads 31*a* and 31*b*, spans the annular groove or recess 41 and thus does not contact the surface of plate 26 which may be dust laden. Thus, during a subsequent recording or reproducing operation of apparatus 10, the annular area of the magnetizable surface of record disk 28 contacted by heads 31*a* and 31*b* is relatively dust-free and, accordingly, is not subjected to excessive wear by reason of its repeated contact with the heads. Since heads 31*a* and 31*b* are disposed for actual contact with record disk 28 during recording and reproducing operations of apparatus 10, the signals are recorded and reproduced with relatively high amplitude, as compared with the arrangement in which a narrow gap is maintained between the heads and the pliant record disk. Further, by reason of the contact of the heads with the record disk, the problems of maintaining uniform a relatively small gap therebetween are avoided.

Figure 5:
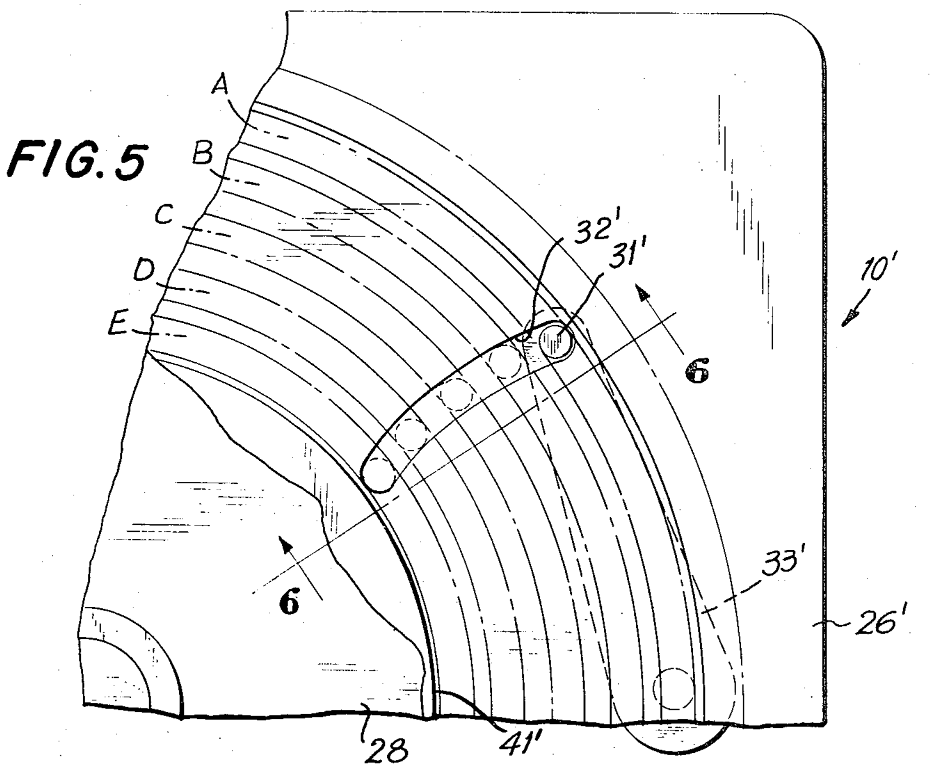
FIG. 5 is a fragmentary, enlarged top plan view of a portion of a recording and/or reproducing apparatus according to another embodiment of the invention, and particularly in which signals can be selectively recorded in a plurality of annular record tracks at different radial distances from the center of the record disk.
Figure 6:
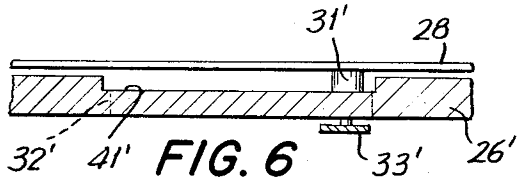
FIG. 6 is a fragmentary sectional view taken along the line 6—6 on FIG. 5.
Figure 7:
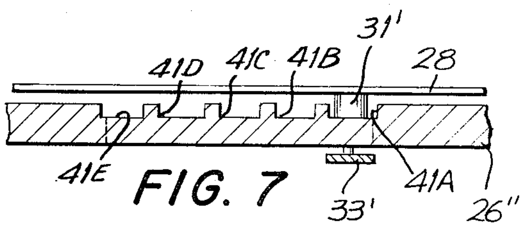
FIG. 7 is a sectional view similar to that of FIG. 6 but illustrating still another embodiment of the invention.

In the apparatus 10 described above with reference to FIGS. 1–3, it has been assumed that each of heads 31*a* and 31*b* is maintained at a fixed radial position from the axis of shaft 17, that is, from the center of record disk 28, thereby to record and reproduce signals in a single annular record track. However, as shown on FIG. 5, by way of example, an apparatus 10' according to this invention may have each transducer or head 31' thereof supported on a pivoted arm 33' so as to be movable along an elongated slot 32' formed in the support plate 26' and extending generally in the radial direction in respect to the axis of rotation of record disk 28. Thus, each head 31' can be selectively positioned at any one of, for example, five different positions spaced apart along slot 32' and which respectively correspond to or trace the concentric, annular record tracks A,B,C,D and E represented in broken lines on FIG. 5. In the case where two or more annular record tracks are traced on the pliant record disk 28, for example, as described with respect to FIG. 5, the surface of support plate 26' confronting the magnetizable surface of record disk 28 in accordance with this invention may be formed with a single groove 41' which is of sufficient radial extent to encompass all of the record track areas, for example, as shown on FIGS. 5 and 6. Alternatively, in the case where a head or heads may trace a plurality of annular record track areas on the pliant record disk 28, the surface of the support plate 26'' which confronts the record disk 28 may have an individual annular recess or groove for each annular record track area, for example, annular grooves 41A,41B,41C,41D and 41E positioned so as to be coextensive with the record tracks A,B,C,D and E, respectively on FIG. 5. Whether the head or heads trace one or more annular record tracks on the pliant record disk which is contacted by the head or heads during recording and reproducing operations, the present invention ensures that the area or areas of the record disk contacted by the head or heads do not pick up dust or other foreign particles from the support plate during the periods when the record disk is at rest and sagging limply against the support plate. Thus, damage to the record disk is avoided and relatively high fidelity recording and reproduction of the signals can be achieved during a long useful life of the record disk.

As previously mentioned, during the recording and reproducing operations of apparatus 10, the pliant record disk 28 is rapidly rotated and is given a planar cofiguration by means of the centrifugal forces resulting from the rotation. The rotated record disk 28 also frictionally and centrifugally induces outwardly spiraling movements or flows of the air in contact with its upper and lower surfaces. Thus, air is pumped outwardly from opening 27 through the gap between support plate 26 and the undersurface of record disk 28 for maintaining record disk 28 out of contact with the surface of support plate 26 during recording or reproducing operations. Since the planar configuration of record disk 28 is achieved centrifugally as is the flow of air outwardly between record disk 28 and support plate 26 for maintaining the separation therebetween, the apparatus 10 according to this invention can be operated in other than a horizontal position, for example, operation of the apparatus 10 can commence with the axis of shaft 17 inclined 30° from the vertical and, during operation, the axis of shaft 17 may even extend horizontally.

It will be apparent that, when the lid 13 is closed to cover record disk 28, the rotation of record disk 28 during recording or reproducing operations also tends to produce flows of air outwardly above disk 28 toward the periphery of the latter from the central region between disk 28 and lid 13. It has been found that such outwardly directed air flows tend to raise up the outer or peripheral portion of record disk 28 with the possibility that the magnetizable surface of the record disk may be moved away from its desired contact with each magnetic transducer or head. Although the reason for the foregoing effect is not completely understood, it is believed to result from the fact that there is no way for air to enter the central portion of the space between record disk 28 and lid 13 as air in such space is centrifugally pumped outwardly above disk 28. Thus, the pressure above record disk 28 is progressively reduced so as to be lower than the air pressure acting below disk 28 where the centrifugally pumped air can circulate smoothly while entering at the central opening 27. Thus, the relatively lower pressure above record disk 28 tends to move the latter upwardly away from plate 26 and, since such upward movement of the record disk is resisted only at the center thereof by the clamping ring 29, the outer or peripheral portion of the record disk tends to move upwardly away from support plate 26 and the head or heads. When the record disk moves out of contact with the head or heads during the recording or reproduction of signals, particularly of video signals, that action will result in the so-called "wobble," "wow" or dropout of the video pictures.

Figure 4:
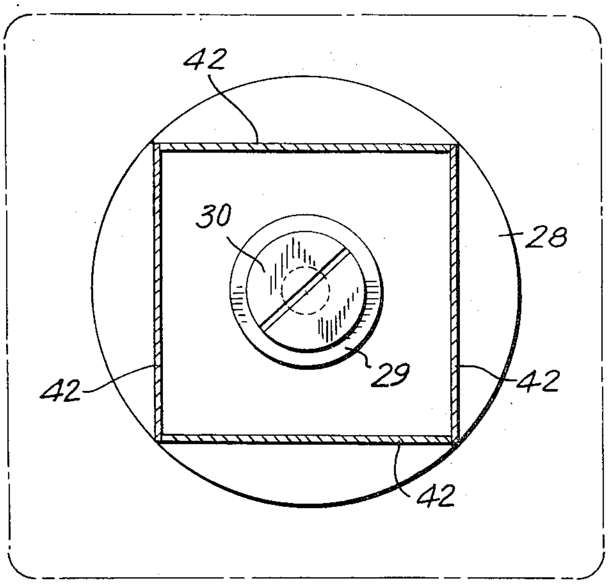
FIG. 4 is a schematic top plan view of the apparatus of FIGS. 1–3, for showing the arrangement of air deflecting elements provided at the underside of the cabinet lid which is indicated in broken lines.
Figure 8:
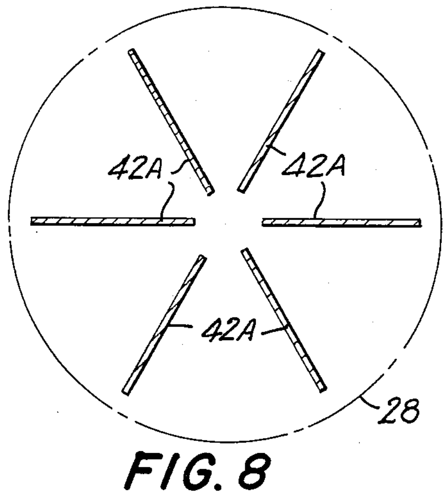
FIGS. 8 and 9 are schematic plan views similar to that of FIG. 4, but showing two other embodiments of the invention.
Figure 9:
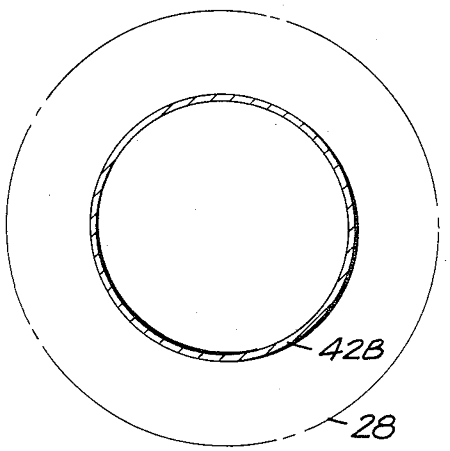

In accordance with the present invention, the foregoing undesirable deflection of the outer or peripheral portion of record disk 28 upwardly away from support plate 26 and the magnetic head or heads is avoided by providing air deflecting elements within the cabinet 11, and particularly depending from lid 13 so as to be disposed adjacent the rotated pliant record disk 28 for disrupting or rendering randomly turbulent the air flows that are centrifugally induced in the space between record disk 28 and lid 13. As shown on FIGS. 2,3 and 4, the air deflecting elements 42 may be constituted by angle members or the like depending from lid 13 in a more or less square arrangement within the confines of disk 28, that is, extending substantially chordally with respect to the periphery of record disk 28. Alternatively, as shown on FIG. 8, the air deflecting elements depending from the lid or cover of the cabinet may extend radially in respect to the underlying record disk 28 or, as shown on FIG. 9, the air deflecting element 42B may be in the form of a ring depending from the lid concentrically with the underlying record disk 28 and having a substantially smaller diameter than the latter. In any case, the deflecting elements 42,42A or 42B are effective to disrupt the centrifugally induced air flows above record disk 28 and to cause such air flows to degenerate into a randomly turbulent circulation, with the result that the air pressures acting against the opposed surfaces of record disk 28 are approximately in equilibrium and the centrifugal force acting on the rotated pliant record disk 28 can be relied upon to maintain the latter in a planar configuration. Accordingly, the positions of the magnetic transducers or heads can be adjusted for the desired contact with the magnetizable surface of record disk 28 during operation of the apparatus 10 with its lid in open position and, thereafter, closing of the lid will not disturb such adjustment or make necessary a new adjustment.

The air deflecting elements 42,42A or 42B provided at the underside of lid 13 have the further advantage of acting as stiffeners for the latter. It will also be seen that, since the head or heads for magnetically recording and reproducing signals on record disk 28 are engageable with the latter from below the record disk 28, the pliant record disk is easily changeable from above merely by opening the lid 13 and loosening or removing the clamping ring 29 and locking screw 30.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. An apparatus for mangetically recording and/or reproducing electrical signals, comprising a rotatable shaft, drive means for rotating said shaft, a pliant record disk mounted at its center on said shaft for rotation with the latter and having a magnetizable surface, a non-rotatable support plate confronting said surface of the record disk and located to support said disk extending limply from said shaft when the latter is at rest and to be spaced from said record disk when the latter is centrifugally urged to a planar configuration in response to rotation of said shaft, electromagnetic transducer means extending through said support plate for contacting said magnetizable surface, even when said disk attains said planar configuration, and tracing at least one record track in a respective annular area of said surface upon rotation of said disk with said shaft, and said support plate having at least one annular recess in the surface thereof confronting said magnetizable surface of the record disk, said annular recess being at least coextensive with each said annular record track area on the record disk so that, even when said record disk extends limply from said shaft, the transfer of dust from said support plate to each said annular record track area is avoided.

2. An apparatus according to claim 1, in which said transducer means is displaceable in the direction extending radially in respect to said shaft for selectively tracing a plurality of record tracks in annular areas on said record disk at corresponding different radial distances from said center of the record disk.

3. An apparatus according to claim 2, in which said support plate has an individual annular recess in said surface confronting said record disk for each of said annular record track areas traced on said record disk.

4. An apparatus according to claim 2, in which said annular recess of the support plate is of sufficient radial extent to encompass said plurality of record track areas.

5. An apparatus according to claim 1, in which said support plate and record disk are enclosed in a cabinet, and further comprising air deflecting means extending from said cabinet adjacent said record disk for disrupting centrifugally induced airflows across said record disk.

6. An apparatus according to claim 5, in which said cabinet includes a base having said support plate extending across the top portion of said base and provided with an opening through which said shaft extends to the record disk overlying the support plate, and a lid which, in a closed position thereof, covers said top portion of the base and said record disk, and in which said deflecting means depends from said lid to adjacent said record disk.

* * * * *